(12) United States Patent
Nguyen et al.

(10) Patent No.: US 10,215,868 B2
(45) Date of Patent: Feb. 26, 2019

(54) AUTOMATED HORIZON AUTO-PICKING ON MULTIPLE VOLUMES (71) Applicant: Landmark Graphics Corporation, Houston, TX (US)

(72) Inventors: Nam Xuan Nguyen, Katy, TX (US); Xuewei Tan, Sugar Land, TX (US); Sharan H. Chang, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 131 days.

(21) Appl. No.: 14/910,439

(22) PCT Filed: Oct. 8, 2013

(86) PCT No.: PCT/US2013/063912
§ 371 (c)(1),
(2) Date: Feb. 5, 2016

(87) PCT Pub. No.: WO2015/053756
PCT Pub. Date: Apr. 16, 2015

(65) Prior Publication Data
US 2016/0209530 A1  Jul. 21, 2016

(51) Int. Cl.
*G01V 1/30* (2006.01)
*G01V 1/34* (2006.01)
*G01V 1/28* (2006.01)

(52) U.S. Cl.
CPC .............. *G01V 1/30* (2013.01); *G01V 1/28* (2013.01); *G01V 1/308* (2013.01); *G01V 1/34* (2013.01);
(Continued)

(58) Field of Classification Search
CPC . G01V 1/28; G01V 1/30; G01V 1/307; G01V 1/308; G01V 1/32; G01V 1/325;
(Continued)

(56) References Cited

U.S. PATENT DOCUMENTS 5,432,751 A   7/1995  Hildebrand
5,537,320 A * 7/1996  Simpson .................. G01V 1/30
                                               702/14
(Continued)

FOREIGN PATENT DOCUMENTS

WO    WO-2015053756 A1    4/2015

OTHER PUBLICATIONS

"IHS Seismic and Geographic Interpretation Software—Kingdom", [online]. © 2012 IHS. [archived on Sep. 4, 2012]. Retrieved from the Internet: <URL: https://web.archive.org/web/20120904224504/http://www.ihs.com/products/oil-gas-information/analysis-software/kingdom-seismic-interpretation/>, (2012), 2 pgs.
(Continued)

*Primary Examiner* — Stephen W Smoot (57) ABSTRACT

The disclosure describes a method and apparatus for performing automated horizon picking on a based volume and snapping auto-picked horizons to other seismic volumes in 4D and multi-azimuth seismic interpretation workflow. Changes made to an initial interpretation may be automatically updated on the other seismic volumes. The automated horizon auto-picking can be batched to setup, run, and monitor auto-picked horizons on a large number of seismic volumes without requiring manual updating of interpretations on each individual volume.

20 Claims, 8 Drawing Sheets (52) U.S. Cl.
CPC .. *G01V 2210/612* (2013.01); *G01V 2210/643* (2013.01)

(58) Field of Classification Search
CPC .............. G01V 1/34; G01V 2210/612; G01V 2210/643
See application file for complete search history.

(56) References Cited

U.S. PATENT DOCUMENTS

| | | | |
|---|---|---|---|
| 5,537,365 A * | 7/1996 | Sitoh | G01V 1/301 367/38 |
| 5,894,417 A * | 4/1999 | Dorn | G01V 1/301 702/14 |
| 5,940,777 A | 8/1999 | Keskes | |
| 6,016,287 A * | 1/2000 | Klebba | G01V 1/288 367/38 |
| 8,265,876 B1 * | 9/2012 | Yu | G01V 1/301 702/16 |
| 2002/0042678 A1 * | 4/2002 | Bevc | G01V 1/303 702/18 |
| 2004/0062145 A1 * | 4/2004 | Dunn | G01V 1/288 367/72 |
| 2005/0038604 A1 | 2/2005 | Marin et al. | |
| 2008/0285384 A1 | 11/2008 | James et al. | |
| 2010/0214870 A1 * | 8/2010 | Pepper | G01V 1/30 367/72 |
| 2011/0002194 A1 * | 1/2011 | Imhof | G01V 1/32 367/53 |
| 2011/0292761 A1 | 12/2011 | Jiao et al. | |
| 2013/0030710 A1 | 1/2013 | Lomask et al. | |

OTHER PUBLICATIONS

"International Application Serial No. PCT/US2013/063912, International Preliminary Report on Patentability dated Apr. 21, 2016", 7 pgs.

"Paradigm® Automatic 3D Propagator", [online]. © 2012 Paradigm Ltd. [archived on Jan. 21, 2013]. Retrieved from the Internet: <URL: https://web.archive.org/web/20130121134140/http://www.pdgm.com/Products/3D-Propagator.aspx>, (2012), 2 pgs.

"Schlumberger Petrel Seismic Interpretation", [online]. © 2012 Schlumberger Limited. [archived Oct. 31, 2012]. Retrieved from the Internet: <URL: https://web.archive.org/web/20121031193417/http://www.sib.com/services/software/geo/petrel/seismic/seismic_interpretation.aspx>, (2012), 2 pgs.

"TerraFusion™ Interpret", [online]. © 2005-2012 Transform Software and Services, Inc. [archived on Apr. 14, 2012]. https://web.archive.org/web/20120414232640/http://www.transformsw.com/products/terrafusion-interpret.html>, (2012), 1 pg.

"International Application Serial No. PCT/US2013/063912, International Search Report dated Jun. 24, 2014", 3 pgs.

"International Application Serial No. PCT/US2013/063912, Written Opinion dated Jun. 24, 2014", 5 pgs.

\* cited by examiner

AUTOMATED HORIZON AUTO-PICKING ON MULTIPLE VOLUMES

PRIORITY APPLICATIONS

This application is a U.S. National Stage Filing under 35 U.S.C. 371 from International Application No. PCT/US2013/063912, filed on Oct. 8, 2013, and published as WO 2015/053756 A1 on Apr. 16, 2015, which application and publication are incorporated herein by reference in their entirety.

BACKGROUND

The present disclosure relates generally to methods for automated seismic data interpretation in seismic volumes of data, and more particularly, relates to automated seismic interpretation to run horizon auto-picking on a based volume and to then associate the auto-picked horizon with a plurality of seismic volumes.

Seismic reflection surveys, both land and marine, are often performed using seismic data acquisition methods to collect seismic data. This provides a volume of the earth's stratigraphy for identifying geological structures, such as horizons and faults in the Earth's subsurface. Seismic reflection is a method of generating seismic waves and measuring the time taken for the seismic waves to travel from the source of the waves, reflect off an interface, and be detected by an array of receivers at the surface. Each receiver's response to a single shot of seismic energy is known as a trace and is recorded for analysis. In land acquisition, seismic waves are transmitted from the surface, produced either mechanically or by explosive device. Resulting reflections from the subsurface are received at geophone sensors. In marine data acquisition surveying geological structures underlying a body of water, a water-going vessel is utilized to tow acoustic sources and seismic streamers supporting an array of hydrophones to detect reflected seismic waves.

Interpretation of seismic reflection surveys often involves analyzing multiple volumes of data containing structural information (e.g., faults or horizons) and seismic information (e.g., seismic amplitude). Interrelationships between these multiple volumes of data are becoming increasingly important for exploration, development, and production purposes. Furthermore, there has been an increase in the number of surveys performed and data types recorded, increasing the number of seismic volumes of data that must be interpreted. Manual interpretation across multiple volumes of data, such as an interpreter manually picking horizon data in one volume and re-interpreting the horizon data on other volumes, is very time-consuming. An additional inconvenience occurs when a change to an initial interpretation of manually picked horizon data causes a need to manually update horizon interpretations on the other seismic volumes. A method for automatically updating the other volumes with any changes in interpretation would aid in management of the large number of seismic volumes that interpreters are faced with and increase precision of interpretations by reducing inaccuracies resulting from tedious manual interpretation of horizon data.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

This disclosure describes a method and apparatus for performing automated horizon picking on a based volume and snapping auto-picked horizons to other seismic volumes. In many cases, these other seismic volumes will be part of 4D or multi-azimuth seismic interpretation workflow. Changes made to an initial interpretation may be automatically updated on the other seismic volumes. The automated horizon auto-picking can be batched to setup, run, and monitor auto-picked horizons on a large number of seismic volumes without having to manually update interpretations on each individual volume.

In some examples, the method includes receiving a seed horizon input associated with a "based volume." The "based volume" refers to a seismic volume from which the seed horizon input is picked, the seed horizon input representing an initial interpretation of data within the based volume. The based volume may represent: a single time period in a 4D survey mapping the changes in a sub-surface formation over time or a single azimuth in a multi-azimuth survey mapping a sub-surface formation from different azimuth angles. In many examples, the method further includes auto-picking an output horizon based on the seed horizon input and automatically re-interpreting the output horizon on the other seismic volumes associated with the based volume.

Figure 1A:
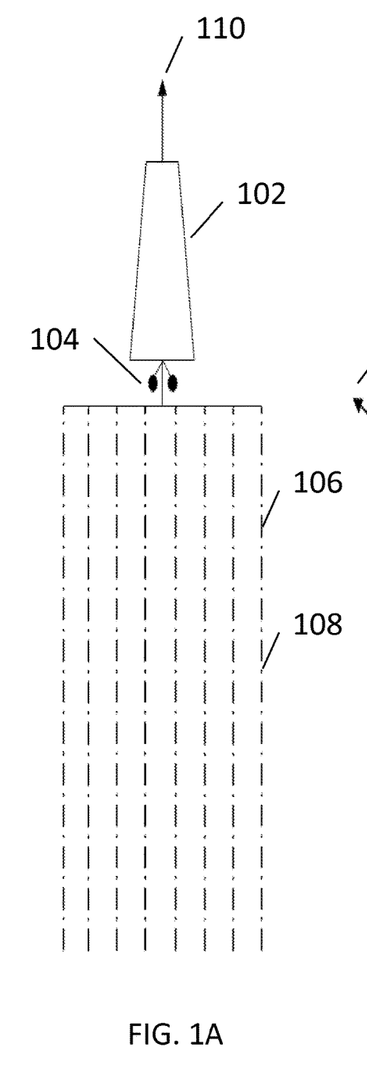
FIGS. 1A-B depict example marine seismic survey system configurations.
Figure 1B:
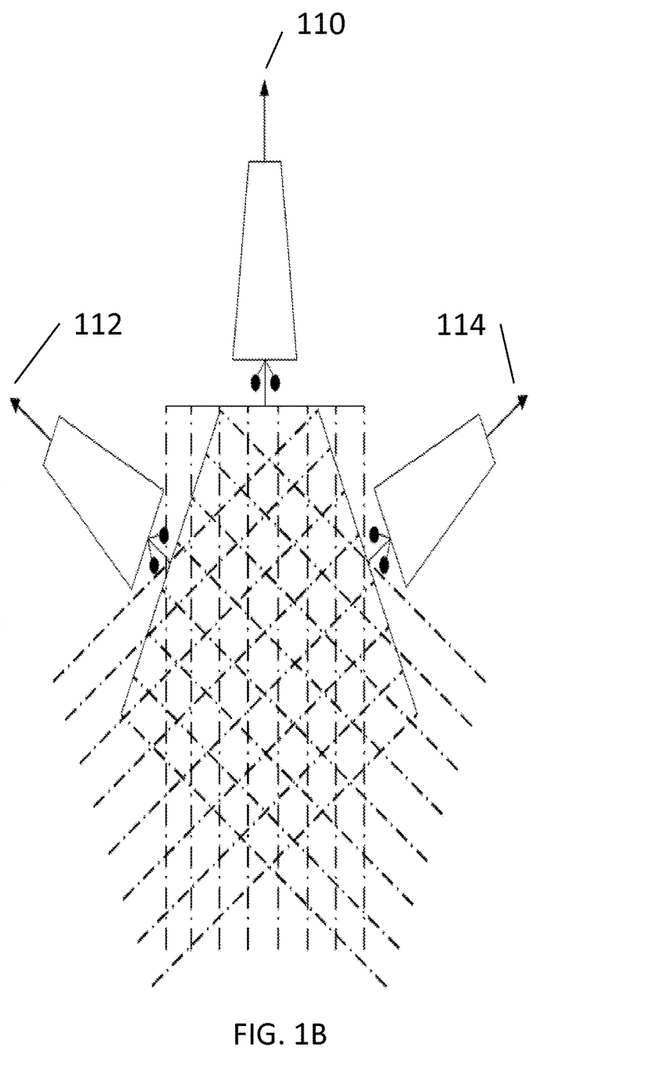

Referring now to FIGS. 1A-B, these figures depict example marine seismic survey configurations having a seismic vessel 102 towing at least one acoustic source 104 (e.g., an air gun) and a plurality of streamers 106 including a plurality of hydrophones 108 to conduct marine data acquisition. As can be seen in FIG. 1A, assuming that the reference plane for azimuth angles is true north, measured as a 0° azimuth, the seismic vessel 102 is pointing in a 0° azimuth direction of travel 110. The term "azimuth" refers to the angle of a line defined by the source and receiver coordinates of a measured seismic trace measured in degree clockwise from the north. As the seismic vessel 102 travels on the surface in the 0° azimuth direction above a survey area, most of the recorded seismic signals travel nearly parallel to the direction of travel 110. This seismic survey is often referred to as narrow-azimuth or NAZ survey. Data for the survey area is acquired from only one direction in NAZ surveys and recorded in a seismic volume.

Seismic interpretation may be applied to the seismic volume to correlate along continuous reflectors throughout the seismic volume as the basis for geological interpretation. However, the seismic volume often does not give reflection maps clear enough to do this, mainly due to deficiencies in vertical and horizontal seismic resolution. Noise and processing difficulties may also result in lower quality reflection maps.

The desire for improved mapping led to the development of multi-azimuth or MAZ surveys to overcome the limitations of the linear acquisition pattern of a NAZ survey by acquiring a combination of NAZ surveys at different directions (i.e., survey azimuths). As can be seen in FIG. 1B, the seismic vessel 102 acquires seismic data over the survey area in multiple directions. In this example, the MAZ survey involves the seismic vessel 102 traveling across the same survey area in three different directions of travel 110, 112, and 114. Each survey in the three different directions of travel 110, 112, and 114 is recorded in its own seismic volume. The combination of the multiple seismic volumes provides improved illumination of the survey area subsurface, with higher signal-to-noise seismic data and better resolution of subsurface formations. However, the MAZ survey also results in a larger amount of data that must be processed (e.g., the three-azimuth example in FIG. 1B would provide triple the amount of data as the single, narrow-azimuth survey in FIG. 1A).

More recently, seismic data in existing data acquisition systems have been acquired with an additional parameter of time as the fourth dimension, often referred to as 4D data acquisition, time-lapse seismic, or 4D seismic. Similar to MAZ surveys, 4D seismic surveys also produce multiple seismic volumes that must be processed and interpreted. 4D seismic involves the acquisition, processing, and interpretation of repeated seismic surveys over a survey area with the aim of understanding changes in the subsurface over time, for example, the behavior of producing fields during production. By acquiring seismic volumes with at different time instances, 4D seismic surveys enable the monitoring of physical changes occurring in reservoirs over time.

4D surveys are becoming increasingly more complex, with multiple time volumes per survey. Similarly, MAZ surveys include multiple azimuth volumes per survey. It is possible to perform 4D surveys across multiple azimuths, further increasing the number of seismic volumes that must be interpreted. These seismic volumes are transmitted to processing systems to filter out noise and condition the data in the seismic volumes for interpretation. After processing, the seismic volumes are loaded onto computer workstations for interpretation.

Figure 2A:
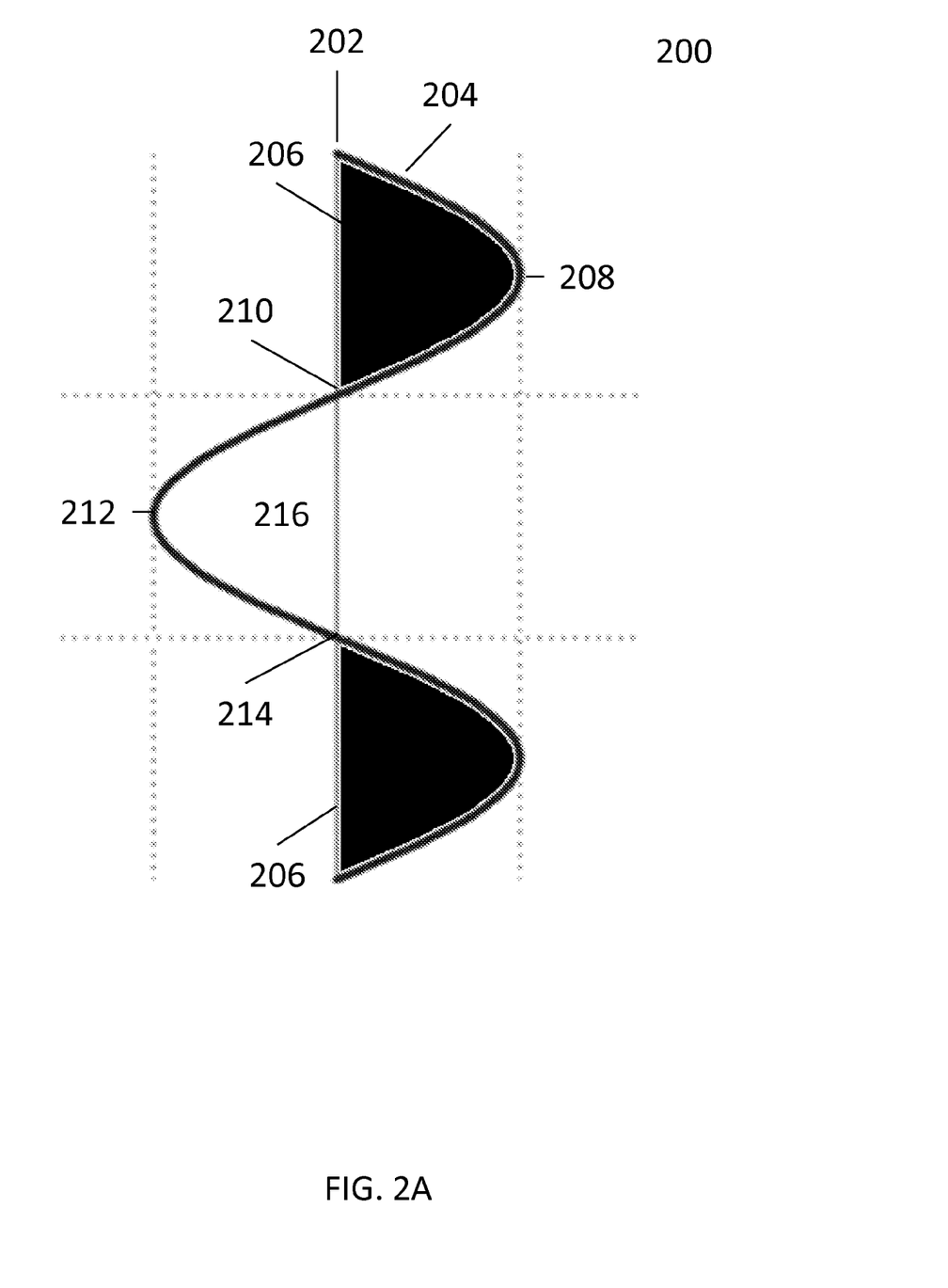
FIGS. 2A-B depict example signals for values of a single seismic reflection recorded in the seismic volume and an exemplary seismic section as a plurality of seismic traces.

An interpreter may have a large number of seismic traces to interpret. A seismic trace 200, as depicted in FIG. 2A, represents the signal for values of a single seismic reflection recorded in the seismic volume. Typical seismic volumes contain dense data, on the order of thousands of traces per square mile of survey area. In the seismic trace 200, where the signal crosses to above zero amplitude, the area under the signal line 204 is depicted as colored in black to indicate a "peak" 206 in the seismic trace 200. The excursion of the signal line 204 reaches a maximum amplitude value 208 before making a positive-to-negative zero amplitude crossing 210. The excursion of the signal line 204 to below zero amplitude, reaching a minimum amplitude value 212 before making a negative-to-positive zero amplitude crossing 214, is called a "trough" 216. The peak 206, trough 216, zero amplitude crossings 210, 214 are seismic onsets that may be applied during horizon interpretation.

As an example, as seismic energy is transmitted through the subsurface of the survey area, the seismic energy encounters boundaries between rock layers with differing acoustic properties, represented by a parameter referred to as "impedance." A change in impedance causes a portion of the seismic energy to be reflected back to the surface, while the rest of the seismic energy continues to be transmitted through the subsurface. The next change in impedance at another boundary between rock layers causes another portion of the seismic energy to be reflected back to the surface. At a boundary where the impedance increases, the reflected seismic energy may be recorded as a black-colored peak 206 followed by a white-colored trough 216. If there is a decrease in impedance at a boundary, the reflected seismic energy may be recorded as a white-colored trough 216 followed by a black-colored peak 206.

Figure 2B:
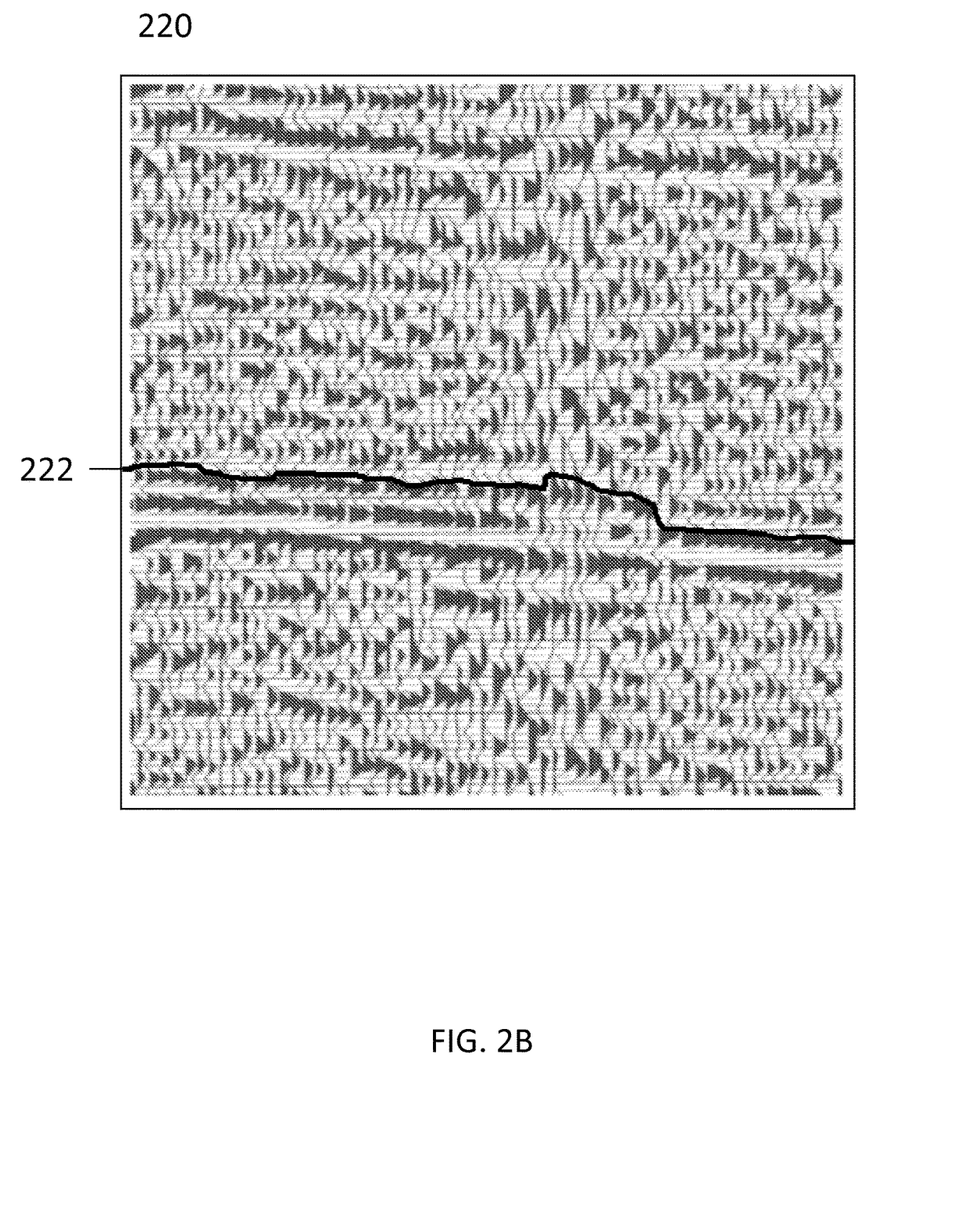

To determine geological structures, seismic reflections are collected along a line or a grid of seismic receivers laid out over the survey area. FIG. 2B depicts an exemplary seismic section 220 as a plurality of seismic traces, each seismic trace 200 as shown in FIG. 2A. This seismic section 220 depicts a line of collected seismic data, representing a vertical cross section of the survey area subsurface. The vertical scale may be represented by two-way travel time or be converted to standard units of depth. Collected seismic data is typically displayed as seismic sections for interpretation. One aspect of interpretation is the marking of surfaces identified to be important by the interpreter. This marking is typically performed on computer workstations to electronically draw lines on displayed seismic sections, with each drawn line representing an interpreted horizon at that location. As an example, drawn line 222 represents an interpreted horizon, along which the interpreter has followed negative-to-positive zero amplitude crossings 214 across the seismic section 220. An interpretation project will typically generate a number, often several dozen to hundreds, of interpreted horizons. Therefore, many interpretation software applications provide auto-pickers or auto-trackers that perform automated picking operations based on a starting set of seed picks for any single volume of data.

Figure 3:
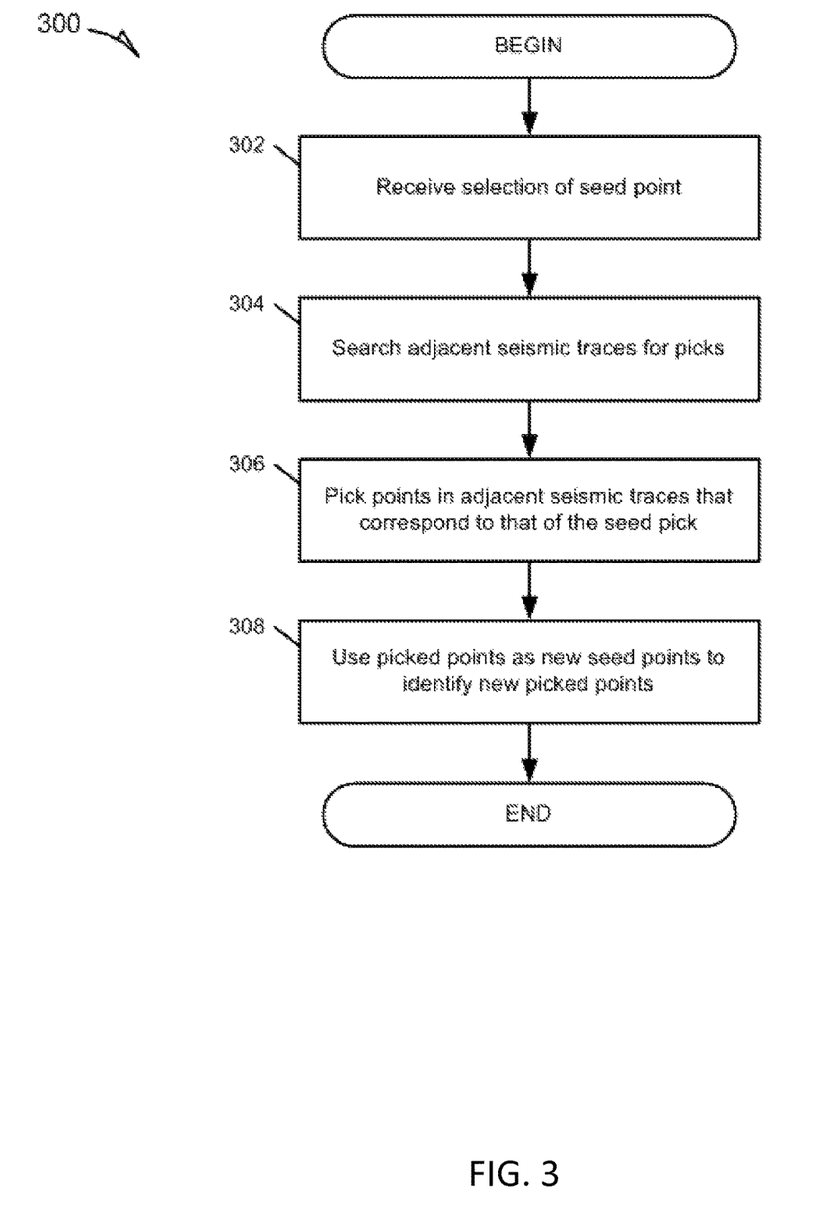
FIG. 3 illustrates a flow diagram of a method for auto-picking horizons.

FIG. 3 illustrates a method 300 of auto-picking horizons. At block 302, the method 300 begins by receiving an interpreter selection of a seed point representing a seismic onset. For example, the interpreter often selects at least one seed point in a seismic trace. Seed point selection is based on some interpreter criterion (e.g., a characteristic or attribute of the seismic reflection at a particular point in the seismic trace). At block 304, the method 300 searches adjacent locations in unpicked seismic traces, based on the characteristic of the seed point, for similar values. At block 306, points are picked in the seismic traces which have characteristics corresponding to that of the seed point. The method 300 continues at block 308 by using picked points as new seed points to identify and select new picked points.

However, the advent of 4D and multi-azimuth seismic presents challenges associated with synchronizing picks across the multiple, related volumes of data generated by the two survey types. These challenges include how to update interpretations across volumes, when the user has made a change to the initial interpretation in the seed picks. As a result, it would be desirable to have a method for performing horizon auto-picking on a based volume with the initial seed picks, after which any auto-picked horizon could be snapped to related volumes of data. Similarly, a manually picked horizon could be snapped to related volumes of data. In some examples, it would also be desirable to have the ability to automatically update the volumes with any changes made to the interpretations or manually picked horizons in the based volume.

Figure 4:
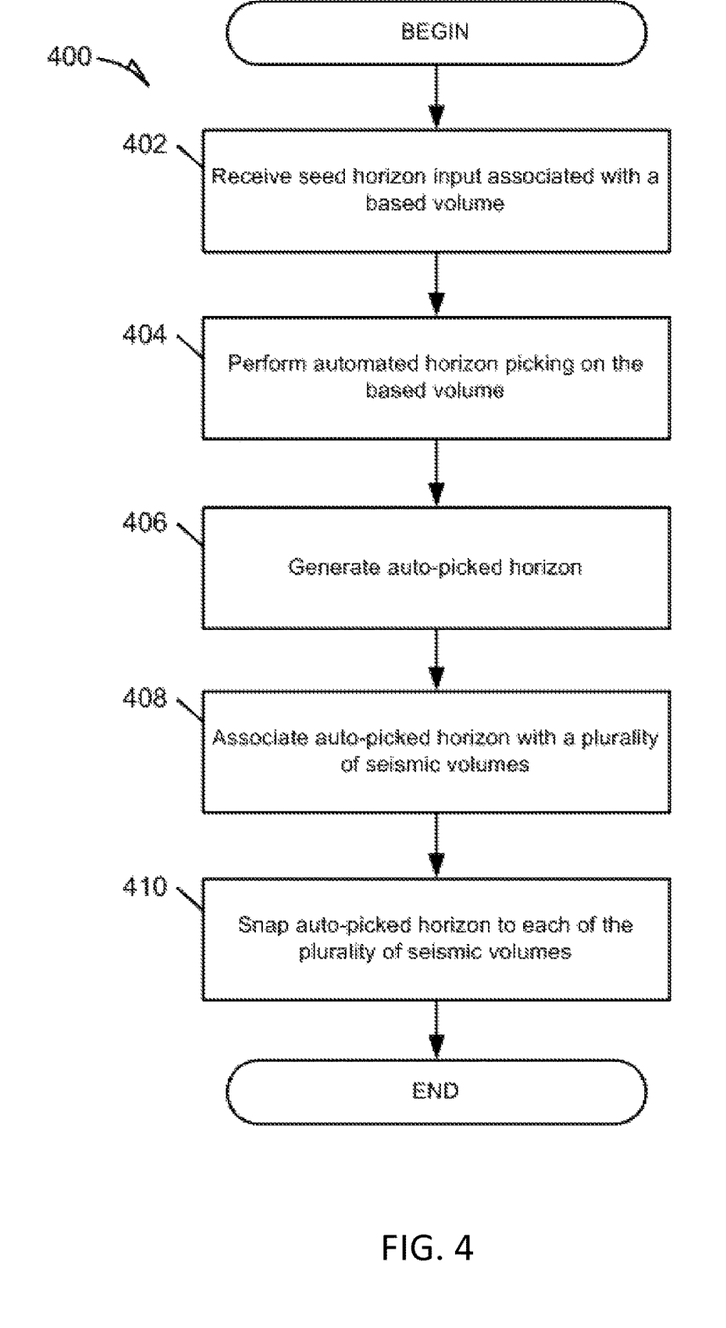
FIG. 4 illustrates a flow diagram of a method for auto-picking horizons on a based volume and snapping auto-picked horizons to related seismic volumes.

FIG. 4 is a flowchart illustrating a method 400 for auto-picking horizons on a based volume and snapping auto-picked horizons to related seismic volumes. At block 402, the method 400 begins by receiving a seed horizon input associated with a based volume. The seed horizon input may represent an initial interpretation of the data within the based volume. In an embodiment, the seed horizon input includes at least one seed point. Seed points are associated with a seismic onset that occurs at a particular point in a seismic trace of the based volume.

The seismic onset is often determined to be a positive amplitude peak at that particular point in the based volume. Other seismic onsets, such as a negative amplitude trough, a maximum amplitude value, a minimum amplitude value, a negative-to-positive zero amplitude crossing, a positive-to-negative zero amplitude crossing, a phase, or a frequency at that particular point in the based volume may also be used. Those of ordinary skill in the art will understand that the term "seismic onset" is used for purposes of specificity only and should be understood to apply to any seismic attribute associated with the particular point in the based volume selected to be a seed point. The seismic attribute may be a mathematical description of the shape or a characteristic of a seismic trace over specific time intervals.

In some embodiments, the interpreter specifies an area of interest or provides a bounded time interval representing the maximum and minimum time interval of interest. In this way, evaluation of seismic onsets may be restricted to only a portion of a seismic volume, rather than having the full seismic volume or full length of each seismic trace examined.

At block 404, the method 400 continues by performing an automated horizon picking operation on the based volume using the seed horizon input. The seed horizon input may be a previously interpreted horizon or a new horizon interpretation, which may include an interpretation comprising at least one seed point in a seed horizon. Those of ordinary skill in the art understand that the terms "tracking" and "picking" are interchangeable. Automated horizon tracking or picking operations are performed over an area of the seismic volume based on the seed horizon input. For example, a horizon may be auto-picked across an area spanning the entire seismic volume or restricted to an interpreter-specified area within the seismic volume. When auto-picking across entire seismic volumes, it is advantageous to check the consistency of picks as the picks move away from an initial, manually interpreted point (e.g., the seed point). Alternatively, the horizon may be auto-picked along a seismic line, either an in-line or a cross-line, within the seismic volume.

If the interpreter is trying to pick a horizon with a positive amplitude seismic onset that is identified on one trace of a line as a seed pick, the horizon may be auto-picked by automatically making a pick along an adjacent trace on the line. The pick should be located at a point of maximum amplitude value and proximate in depth or time as the seed pick. This process can be extended to additional adjacent traces to pick the horizon along the entirety of the line. By requiring that the amplitude of a candidate point to be picked be similar to that of the last picked point on the previous trace, thresholds may be set to generate more accurate picks. In an embodiment, a relative difference is calculated by comparing the amplitude of the last picked point to the amplitude of a new point that is the candidate point to be picked. If the relative difference exceeds a certain amount, picking stops. In another embodiment, an absolute amplitude value is used as criteria for stopping picking. In the example of picking the positive amplitude seismic onset, if the candidate point to be picked has a value below the absolute amplitude value, picking stops. Similarly, in an example of picking a negative amplitude seismic onset, if the candidate point to be picked has a value above the absolute amplitude value, picking stops. In this manner, if the amplitude change from one trace to the next exceeds an interpreter-specified tolerance, the picking stops and no further picks are made along the line. The process described above may be applied to picking along other types of seismic onsets, such as minimum amplitude values for negative amplitude seismic onsets, zero amplitude values, positive-to-negative zero amplitude crossings, or negative-to-positive zero amplitude crossings.

The automated horizon picking operations may be performed according to a set of parameters. For example, toggling a block-at-faults parameter designates fault planes to function as barriers to picking. Toggling a block-at-volume parameter limits the picking area based on an interpreter-provided set of attribute values within the seismic volume. This is useful for revealing seismic volume attributes that indicate faults or for identifying specific amplitude magnitudes. Toggling a polygon parameter uses software polygons to prevent the picking across fault zones. Polygons can also be used to define an area of interest. Whether polygons are used to define areas of interest or to block picking depends on whether the polygon is set to exclusive (i.e., indicating fault polygons) or inclusive. Inclusive polygons only track inside the intersections of the inclusive polygons and a picking area, the picking area referring to either the area spanning the entire seismic volume or the interpreter-specific area within the seismic volume. A tile size parameter may be modified to increase or decrease aggressiveness of horizon picking. In an embodiment, both a starting tile size and an ending tile size may be defined. Smaller tile sizes are preferably used for seismic volumes containing strong reflectors and less faulted data. Larger tiles are preferably used for seismic volumes containing discontinuous reflectors and heavily faulted seismic data. Starting with larger tile sizes tracks more consistently over a larger area, which is beneficial to avoiding jumping across faults if the faults have not yet been interpreted.

An iterative approach to auto-picking may be performed to generate better tracked horizons. In a first pass, auto-picking is performed on main horizons and faults. Faults may be auto-tracked using techniques similar to the process described for auto-picking horizons. This output of this first pass may be fine-tuned by repeating the auto-picking process by using the result of the first pass as a seed grid. Multiple cycles of iteration may be repeated until the data within the seismic volume has been interpreted to a desired level of detail or a limit set by the noise in the data set has been reached. In an example, auto-picking may use a default starting tile size of 11, meaning that all traces around a seed point within an area of 11 lines by 11 traces must fall within a score range, and each trace will be used for further picking. The score refers to a value defining how aggressively data within the seismic volume is to be tracked, wherein data is compared to the picking parameters to measure how close a pick comes on a scale of 0 (no match) to 100 (a perfect match). A match is made if the result of the comparison falls within the score range. After the 11×11 tile picking is complete, the next iteration starts using a smaller tile size (e.g., 10×10 or 9×9 tile). Picking continues with the tile size incrementally reducing until the ending tile size is reached, at which point the picking is complete. In another example, areas of the horizon having a low difference to the seed horizon input or high amplitude are tracked first. In subsequent steps, auto-picking becomes less strict and picking is performed on incrementally increasing differences to the seed horizon input or decreasing amplitude values. Both examples discussed above result in higher quality output horizons that may decrease the need for future editing.

At block 406, the method 400 continues by generating an auto-picked horizon using the seed horizon input. The interpreter may select an output horizon to which data from picking operations will be stored as horizon data. In some embodiments, the seed horizon input includes previously interpreted horizon data. When interpreting noisy data in the seismic volume, it may be desirable to incrementally track a limited area around a small interpretation. The interpreter adjusts the data during the process to extend interpretations in a controlled manner by adding new tracked data to previously interpreted, old horizon data.

The automated horizon picking operations generates an auto-picked horizon as output. Various types of horizons can be generated according to input from the interpreter. As an example, a default type generates auto-picked horizons having the same attribute and onset as the seed horizon input. Toggling an amplitude type generates auto-picked horizons containing amplitude values for each of the auto-picked horizons' structure picks. Toggling a tile size type displays the tile sizes used to track horizons at locations within the picking area. Regions tracked with larger tile sizes indicate a higher confidence level than regions tracked with lower tile sizes. Toggling a generation map type generates output that indicates the sequence of picking for points within the picking area.

An input-as-output function tracks and saves the output horizon to an input horizon, allowing for controlled extension of the horizon into new areas. In one embodiment, any old horizon data contained within the picking area is cleared before picking. Re-picking occurs using a current interpretation and replaces any previously existing interpretations in the output horizon, with newly tracked data saved to the selected output horizon. However, different parameters, such as fault blocking, may prevent the entire picking area from being re-tracked. In another embodiment, newly tracked data does not replace the old horizon data. An auto-create function automatically creates and saves a new horizon output. This may be useful if adjacent areas contain good horizon interpretations that are not desired to be re-tracked. These two functions control whether any new picks in newly tracked data are considered to be defining a new horizon or modifying picks from an existing horizon.

At block 408, the method 400 continues by associating the auto-picked horizon with a plurality of seismic volumes. In an embodiment, the based volume may represent a single seismic volume of data that is associated with a plurality of seismic volumes of data representing different seismic subsets. For example, the based volume may contain seismic data presented in a time, or a depth domain. The plurality of seismic volumes of data may contain seismic data acquired and processed at different times or with different processing parameters. Many seismic subsets include: angle or offset limited stacks (full or near, mid, far stacks), azimuthal stacks (narrow azimuth, multiple azimuths), pre-stack time (raw or migrated); post-stack time (migrated or un-migrated); post-stack depth (migrated pre or post-stack, re-migrated); and pre-stack depth. This list is not exhaustive, however, as various other seismic types exist.

In another embodiment, the based volume may represent a single volume of seismic data associated with a single azimuth that is associated with a plurality of volumes of seismic data representing other azimuths from a multi-azimuth seismic survey.

Several processing algorithms may be applied to horizons after auto-picking. As an example, horizons may be snapped to a given seismic onset after horizon picking. At block 410, snapping is performed to adjust the auto-picked horizon on each of the plurality of seismic volumes after being associated in block 408 and aligning the auto-picked horizon to seismic onsets within each of the plurality of seismic volumes. Snapping fine-tunes a horizon such that it is positioned consistently on a specific part of a trace waveform by determining where each pick will be placed on a trace. Snapping may automatically determine whether the input horizon (e.g., the auto-picked horizon) is closer to a peak or trough on the trace. Seismic onsets picked on adjacent traces for snapping will then attempt to follow the amplitude in a consistent manner.

Alternatively, the interpreter may define the type of seismic onset that the horizon should be snapped to. As noted earlier, seismic onsets may include, but are not limited to: positive peaks, maximum amplitudes, negative troughs, minimum amplitudes, and zero-amplitude crossings (both increasing from negative-to-positive and decreasing from positive-to-negative). In addition to seismic onsets, horizons may also be snapped to a phase angle or a value that is provided by the interpreter prior to beginning auto-picking operations.

Snapping can create an amplitude horizon at each seed point read from the input horizon. In other words, amplitude extraction is performed and the extracted amplitudes are copied from the seismic volume into an output horizon. The interpreter may select the volume that a snapped horizon, the output horizon, should be saved to. The output horizon may be snapped to a new horizon or overwrite the input horizon, both within the input volume (i.e., the based volume). Alternatively, the output horizon may be snapped to other seismic volumes. Snapping adjusts the position of each seed point read from the input horizon throughout the input seismic volume based on a defined seismic onset. A result of the snapping process is either saved to a new output horizon or overwrites the input horizon. The interpreter may select the volume that a snapped horizon, its seismic onset, and the output horizon should be saved to. Alternatively, an input horizon may be snapped to different seismic onsets in other seismic volumes.

Other snapping parameters may include a snap limit, in seismic sample interval, to define the distance from its current value the auto-picked horizon may shift the seismic onset to be snapped to. A constrain-to-area selection allows the interpreter to select a polygon to constrain the horizon snapping to an area of interest. A crossing value parameter specifies an exact amplitude value to search for on a trace when the snap option is set to crossing value.

When snapping, doublets (e.g., two points on the same trace associated with a single horizon) are sometimes encountered. The interpreter may select whether, in situations of doublets, to pick an upper onset, a lower onset, a larger onset, or to not pick. Sometimes, certain horizon picks cannot be snapped. By default, these points are discarded. However, the interpreter may select to keep the original points. Further, the input seismic onset sometimes does not match the snapped seismic onset. A default may be set to not perform snapping. However, if the interpreter desires to salvage horizon picks that do not match the snap onset, a snap up or snap down option may be selected. A constant shift option may be selected to apply a constant shift before snapping to the seismic onset. For example, in time data, a negative shift value snaps upwards and a positive shift value snaps downwards. A default shift value may be set at zero milliseconds.

Although method 400 is described as snapping the auto-picked horizon to other seismic volumes, it will be apparent to those skilled in the art, that the seed horizon input may also be snapped to a particular seismic onset within the based volume prior to performing auto-picking operations on the based volume. The seed horizon input can be snapped to the nearest seismic onset, phase angle or value that meets the snapping criteria. Subsequently, the method 400 would perform auto-picking from the snapped points, rather than any original seed points in the seed horizon input.

Interpretations may be subject to continuous verification by examination of the seismic volumes as a whole. If there is a problem with auto-picked horizons (e.g., no data in a new fault block, or picking that improperly jumped a fault), the interpreter may provide an updated interpretation of seed horizons before re-picking using the corrected interpretation as input.

Figure 5:
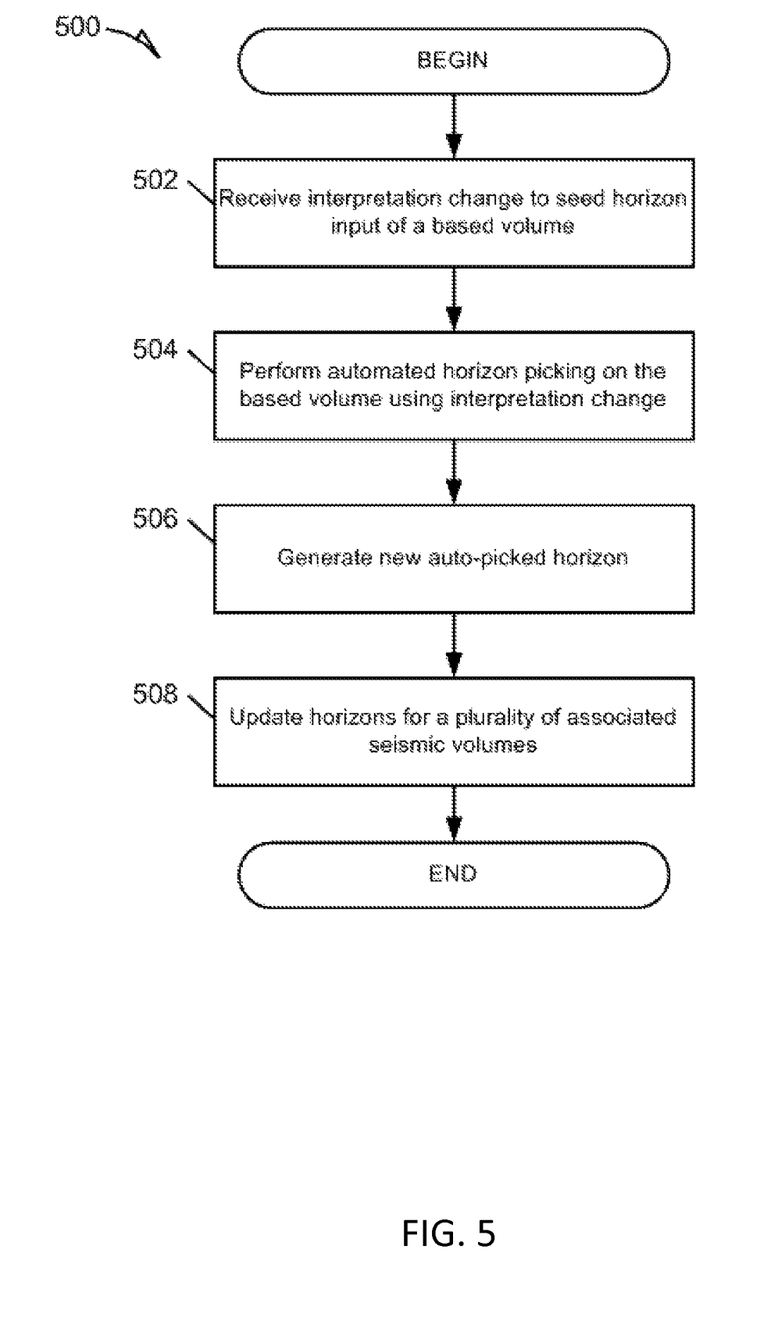
FIG. 5 illustrates a flow diagram of an alternative method of auto-picking horizons in a based volume and snapping auto-picked horizons to related seismic volumes.

Similar to FIG. 4, FIG. 5 also illustrates a flow chart of an alternative method 500 of auto-picking horizons in a based volume and snapping auto-picked horizons to related seismic volumes. At block 502, the method 500 receives an interpretation change to a seed horizon input of a based volume. For example, the interpreter may decide to that a preexisting horizon interpretation should be changed and makes the interpretation change by picking at least one new seed point. At block 504, the method 500 performs auto-picking using the interpretation change as an input. At block 506, the method 500 continues by generating a new auto-picked horizon based on the interpretation change. At block 508, the method 500 updates the horizons for a plurality of associated seismic volumes. In an embodiment of the based volume representing a single azimuth in a multi-azimuth seismic survey, the based volume is associated with a plurality of seismic volumes representing other azimuths from the multi-azimuth seismic survey. The horizons within the associated plurality of seismic volumes are updated to reflect the new auto-picked horizon based on the interpretation change. For example, the new auto-picked horizon may be snapped to the associated plurality of seismic volumes.

Figure 6:
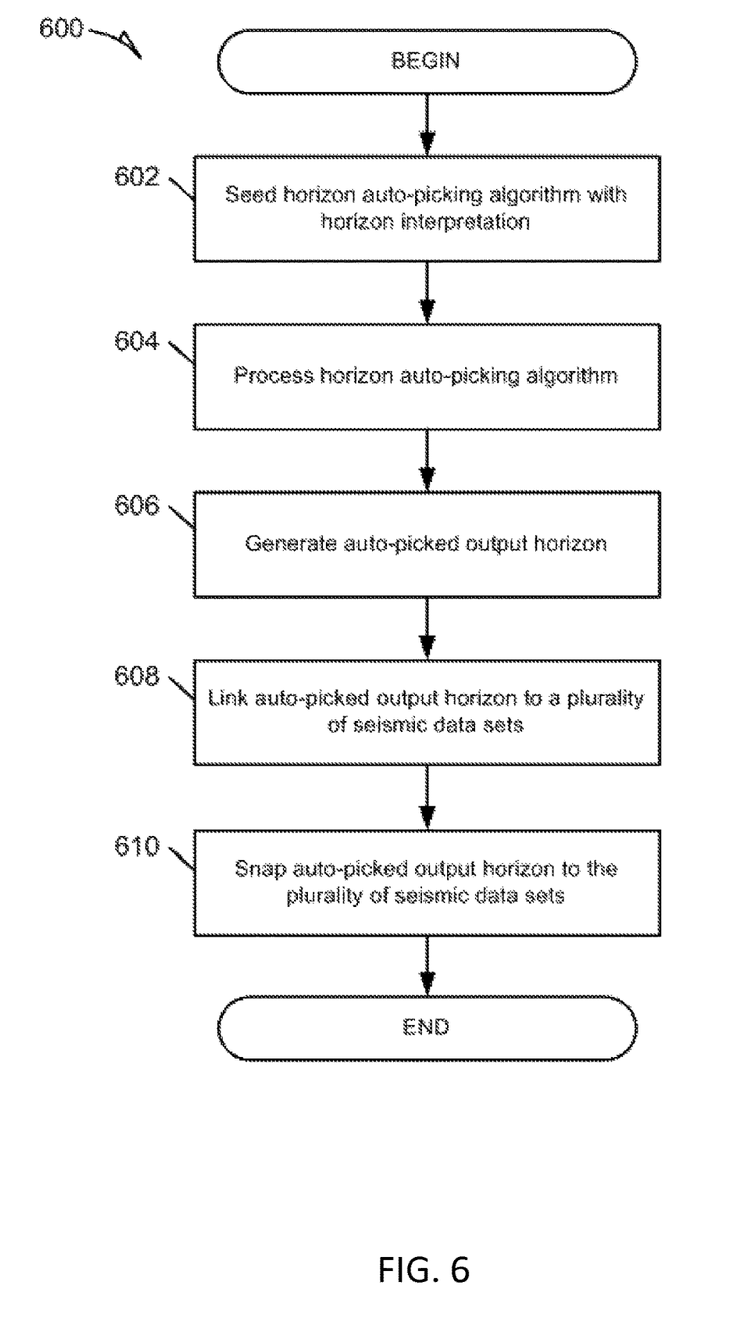
FIG. 6 illustrates a flow diagram of a method for auto-picking horizons with a horizon auto-picking algorithm and snapping auto-picked horizons to linked seismic data sets.

FIG. 6 illustrates a flow chart of a method 600 for auto-picking horizons with a horizon auto-picking algorithm and snapping auto-picked horizons to linked seismic data sets. At block 602, the method 600 seeds the horizon auto-picking algorithm with a horizon interpretation. The horizon interpretation may be a previously interpreted horizon or a new horizon interpretation, which may include an interpretation comprising at least one seed point. At block 604, the horizon auto-picking algorithm is processed using the horizon interpretation as input. At block 606, the method 600 continues by generating an auto-picked output horizon for one of a plurality of seismic data sets using the horizon interpretation as input. At block 608, the auto-picked output horizon is linked to each of the plurality of seismic data sets. In an embodiment, the auto-picked output horizon from a single seismic volume of a 4D seismic survey is linked to other seismic volumes representing different seismic subsets. At block 610, the auto-picked output horizon is snapped to each of the plurality of seismic data sets. As noted earlier, output horizons may be snapped to be aligned with an interpreter specified parameter, such as a type of seismic onset. Any changes made to the horizon interpretation may be automatically updated across each of the plurality of seismic data sets to reflect the change (i.e., new auto-picked output horizons based on the interpretation change are snapped to the linked seismic volumes).

Though arranged serially in the example of FIG. 4-6, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a workstation, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
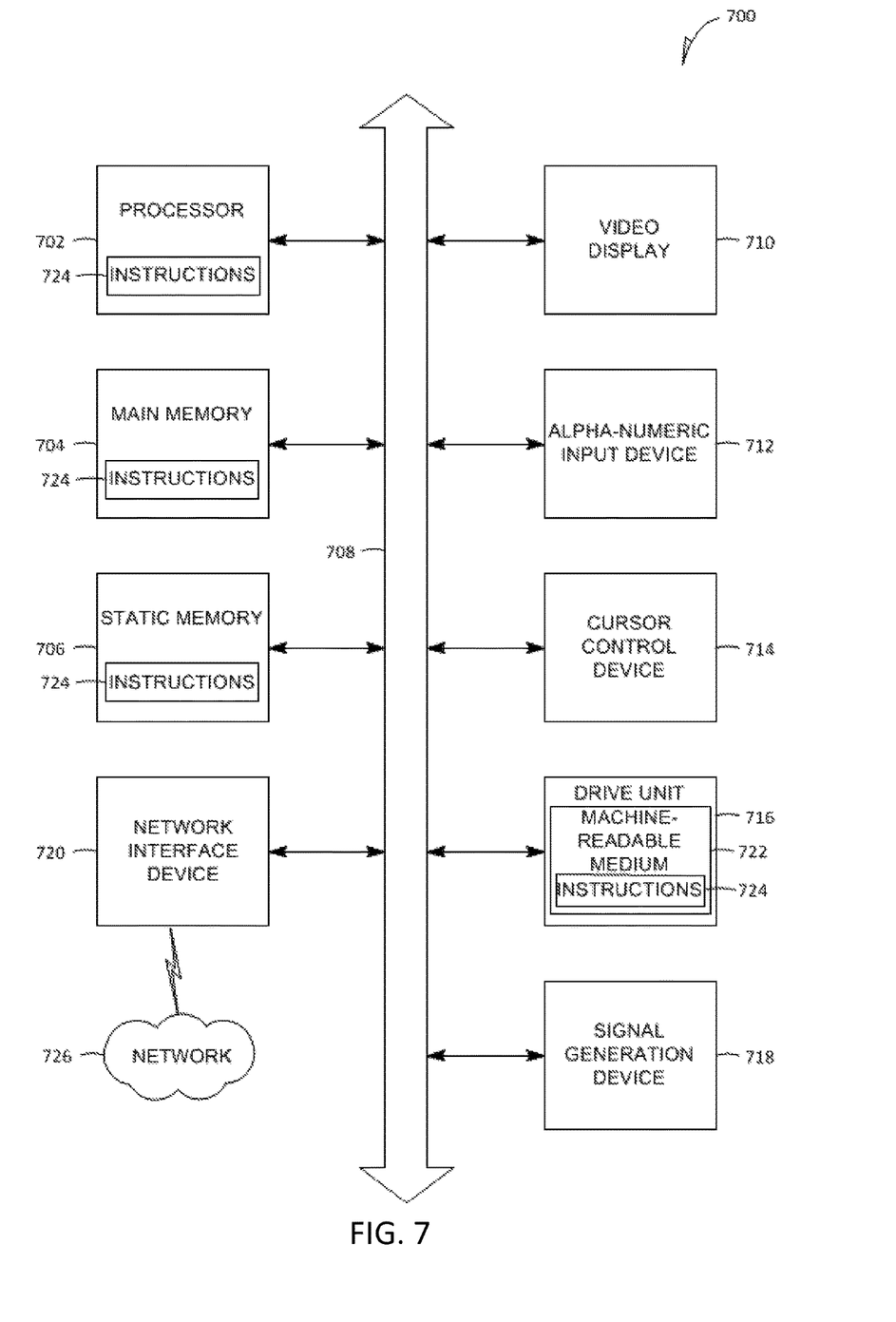
FIG. 7 is a diagrammatic representation of a machine in the example form of a computer system within which a set of instructions for causing the machine to perform any one or more of the methodologies discussed herein may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium and Machine Readable Storage Medium

The disk drive unit 716 includes a machine-readable medium 722 on which is stored one or more sets of instructions and data structures (e.g., software) 724 embodying or used by any one or more of the methodologies or functions described herein. The instructions 724 may also reside, completely or at least partially, within the main memory 704, static memory 706, and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing or encoding data structures used by or associated with such instructions. The term "machine-readable storage medium" shall accordingly be taken to include, but not be limited to, solid-state memories, and optical and magnetic media. Specific examples of machine-readable storage media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. All such machine readable storage media are hardware devices suitable for storing data and/or instructions for a suitable period of time to enable use by the machine, and are therefore non-transitory.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for automatically picking horizons in seismic volumes, comprising:
   displaying, by a computer system, seismic data obtained from a seismic survey of a subsurface formation during production operations within the subsurface formation;
   receiving, via a user interface of the computer system, a seed horizon input including a seed point for a seismic onset in a seismic trace of a based volume in the seismic survey, the seed horizon input representing an initial interpretation of the seismic data within the based volume;
   automatically picking, by the computer system, points along adjacent unpicked seismic traces of the based volume to generate an auto-picked input horizon for the based volume, based on the initial interpretation of the seismic data;
   associating the auto-picked input horizon of the based volume with a plurality of seismic volumes related to the based volume in the seismic survey;
   snapping the auto-picked input horizon to each of the associated plurality of seismic volumes to generate an auto-picked output horizon for each of the plurality of seismic volumes, wherein the auto-picked output horizon for each of the plurality of seismic volumes is positioned relative to a common seismic onset across the plurality of seismic volumes;
   upon receiving, by the computer system, a change to the initial interpretation of the seismic data within the based volume, automatically updating the auto-picked input horizon and the auto-picked output horizon for each of the plurality of seismic volumes by repeating the picking, the associating and the snapping based on the received change; and
   performing the production operations within the subsurface formation, based on the updated auto-picked output horizon for each of the plurality of seismic volumes.

2. The method of claim 1, wherein the change to the initial interpretation is an interpretation change to the seed point for the seismic onset of the based volume, and
   the auto-picked input and output horizons for each of the plurality of seismic volumes are automatically updated to reflect the interpretation change to the seed point.

3. The method of claim 1, wherein receiving a seed horizon input includes receiving a user interpretation of a horizon associated with the based volume.

4. The method of claim 1, wherein the plurality of seismic volumes represent different subsets of the seismic data, and associating the auto-picked input horizon with the plurality of seismic volumes includes associating the auto-picked input horizon with each of the different subsets.

5. The method of claim 1, wherein the seismic survey is a multi-azimuth seismic survey, and the plurality of seismic volumes correspond to different azimuths in which the seismic data was obtained from the multi-azimuth seismic survey.

6. The method of claim 1, wherein the snapping includes positioning the auto-picked output horizon for each of the plurality of seismic volumes relative to at least one of a minimum amplitude value, a maximum amplitude value, or a zero amplitude crossing value.

7. A method comprising:
   displaying, by a computer system, seismic data from a seismic survey of a subsurface formation during production operations within the subsurface formation;
   receiving, by the computer system, a horizon interpretation including a seed point for a seismic onset in a seismic trace of a based volume of seismic data within the seismic survey;
   automatically picking, by the computer system, points along adjacent unpicked seismic traces of the based volume to generate an auto-picked input horizon for the based volume, based on the initial interpretation of the seismic data;
   linking the auto-picked input horizon to each of a plurality of seismic volumes related to the based volume in the seismic survey;
   snapping the auto-picked input horizon to each of the linked plurality of seismic volumes to generate an auto-picked output horizon for each of the seismic volumes, wherein the snapping positions the auto-picked output horizon to be aligned with a specified parameter;
   upon receiving, by the computer system, a change to the horizon interpretation, automatically updating the auto-picked input and output horizons for each of the plurality of seismic volumes by repeating the picking, the linking and the snapping based on the received change; and
   performing the production operations within the subsurface formation, based on the updated auto-picked output horizon for each of the plurality of seismic volumes.

8. The method of claim 7, wherein receiving the horizon interpretation comprises:
   receiving, from a user via a user interface of the computer system, a seed horizon input including the seed point picked by the user for the seismic onset in the seismic trace of the based volume.

9. A non-transitory computer-readable storage medium that provides instructions, which when executed by one or more processors, cause the one or more processors to perform operations comprising:
   displaying seismic data from a seismic survey of a subsurface formation during production operations within the subsurface formation;
   receiving a seed horizon input including a seed point for a seismic onset in a seismic trace of a based volume in the seismic survey, the seed horizon input representing an initial interpretation of the seismic data within the based volume;
   automatically picking, by the computer system, points along adjacent unpicked seismic traces of the based volume to generate an auto-picked input horizon for the based volume, based on the initial interpretation of the seismic data;
   associating the auto-picked input horizon of the based volume with a plurality of seismic volumes related to the based volume in the seismic survey;

snapping the auto-picked input horizon to each of the associated plurality of seismic volumes using the auto-picked input horizon to generate an auto-picked output horizon for each of the plurality of seismic volumes, wherein the auto-picked output horizon for each of the plurality of seismic volumes is positioned relative to a common seismic onset across the plurality of seismic volumes; and upon receiving a change to the initial interpretation of the seismic data within the based volume, automatically updating the auto-picked input horizon and the auto-picked output horizon for each of the plurality of seismic volumes by repeating the picking, the associating and the snapping based on the received change, wherein the production operations within the subsurface formation are performed based on the updated auto-picked output horizon for each of the plurality of seismic volumes.

10. The non-transitory computer-readable storage medium of claim 9, wherein the change to the initial interpretation is an interpretation change to the seed point for the seismic onset of the based volume, and the auto-picked input and output horizons for each of the plurality of seismic volumes are automatically updated to reflect the interpretation change.

11. The non-transitory computer-readable storage medium of claim 9, wherein the instructions that cause the operations of receiving a seed horizon input comprise instructions that cause receiving a user interpretation of a horizon associated with the based volume.

12. The non-transitory computer-readable storage medium of claim 9, wherein the plurality of seismic volumes represent different subsets of the seismic data, and the auto-picked input horizon is also associated with each of the different subsets.

13. The non-transitory computer-readable storage medium of claim 9, wherein the seismic survey is a multi-azimuth seismic survey, and the plurality of volumes of seismic volumes correspond to different azimuths in which the seismic data was obtained from the multi-azimuth seismic survey.

14. The non-transitory computer-readable storage medium of claim 9, wherein the instructions that cause the operations of performing the snapping operation comprise instructions that cause positioning the auto-picked output horizon for each of the plurality of seismic volumes relative to at least one of a minimum amplitude value, a maximum amplitude value, or a zero amplitude crossing value.

15. A system comprising:
one or more computers and one or more storage devices storing instructions that are operable, when executed by the one or more computers, to cause the one or more computers to perform operations comprising:
displaying seismic data from a seismic survey of a subsurface formation during production operations within the subsurface formation;
receiving a seed horizon input including a seed point for a seismic onset in a seismic trace of a based volume in the seismic survey, the seed horizon input representing an initial interpretation of the seismic data within the based volume;
automatically picking, by the computer system, points along adjacent unpicked seismic traces of the based volume to generate an auto-picked input horizon for the based volume, based on the initial interpretation of the seismic data;
associating the auto-picked input horizon of the based volume with a plurality of seismic volumes related to the based volume in the seismic survey;
snapping the auto-picked input horizon to each of the associated plurality of seismic volumes to generate an auto-picked output horizon for each of the plurality of seismic volumes, wherein the auto-picked output horizon for each of the plurality of seismic volumes is positioned relative to a common seismic onset across the plurality of seismic volumes; and
upon receiving a change to the initial interpretation of the seismic data within the based volume, automatically updating the auto-picked input horizon and the auto-picked output horizon for each of the plurality of seismic volumes by repeating the picking, the associating and the snapping based on the received change, wherein the production operations within the subsurface formation are performed based on the updated auto-picked output horizon for each of the plurality of seismic volumes.

16. The system of claim 15, wherein the change to the initial interpretation is an interpretation change to the seed point for the seismic onset of the based volume, and
updating the auto-picked input and output horizons for each of the plurality of seismic volumes are automatically updated to reflect the interpretation change.

17. The system of claim 15, wherein the instructions that cause the operations of receiving a seed horizon input comprise instructions that cause receiving a user interpretation of a horizon associated with the based volume.

18. The system of claim 15, wherein the plurality of seismic volumes represent different subsets of the seismic data, and the auto-picked input horizon is also associated with each of the different subsets.

19. The system of claim 15, wherein the seismic survey is a multi-azimuth seismic survey, and the plurality of volumes of seismic volumes correspond to different azimuths in which the seismic data was obtained from the multi-azimuth seismic survey.

20. The system of claim 15, wherein the instructions that cause the operations of performing the snapping operation comprise instructions that cause positioning the auto-picked output horizon for each of the plurality of seismic volumes relative to at least one of a minimum amplitude value, a maximum amplitude value, or a zero amplitude crossing value.

* * * * *